US011280829B1

United States Patent
Poolla et al.

(10) Patent No.: US 11,280,829 B1
(45) Date of Patent: Mar. 22, 2022

(54) SYSTEM-ON-CHIP HAVING SECURE DEBUG MODE

(71) Applicant: Xilinx, Inc., San Jose, CA (US)

(72) Inventors: Ramakrishna G. Poolla, Hyderabad (IN); Krishna C. Patakamuri, Hyderabad (IN); James D. Wesselkamper, Albuquerque, NM (US); Jason J. Moore, Albuquerque, NM (US); Edward S. Peterson, Queen Creek City, AZ (US); Steven E. McNeil, Rio Rancho, NM (US)

(73) Assignee: XLNX, INC., San Jose, CA (US)

( * ) Notice: Subject to any disclaimer, the term of this patent is extended or adjusted under 35 U.S.C. 154(b) by 299 days.

(21) Appl. No.: 16/721,843

(22) Filed: Dec. 19, 2019

(51) Int. Cl.
| | |
|---|---|
| *H04L 29/06* | (2006.01) |
| *G01R 31/317* | (2006.01) |
| *G01R 31/3177* | (2006.01) |
| *G06F 21/44* | (2013.01) |
| *H04L 9/32* | (2006.01) |
| *G06F 21/76* | (2013.01) |
| *H04L 9/30* | (2006.01) |

(52) U.S. Cl.
CPC ... *G01R 31/31719* (2013.01); *G01R 31/3177* (2013.01); *G01R 31/31705* (2013.01); *G06F 21/44* (2013.01); *G06F 21/76* (2013.01); *H04L 9/30* (2013.01); *H04L 9/3239* (2013.01); *H04L 9/3247* (2013.01)

(58) Field of Classification Search
CPC ........ G01R 31/31719; G01R 31/31705; G01R 31/3177; G06F 21/44; G06F 21/76; H04L 9/30; H04L 9/3239; H04L 9/3247
See application file for complete search history.

(56) References Cited

U.S. PATENT DOCUMENTS

| | | | | |
|---|---|---|---|---|
| 6,067,407 A | * | 5/2000 | Wadsworth | ......... G06F 11/2294 709/224 |
| 9,270,469 B2 | | 2/2016 | Moore | |
| 2005/0143970 A1 | * | 6/2005 | Roth | ....................... G10L 15/06 704/4 |

(Continued)

OTHER PUBLICATIONS

Jerry Backer, ACM Transactions on Design Automation of Electronic Systems, Pub. date: Dec. 2016, vol. 22, No. 2, Article 31, pp. 31.1-31.24.*

(Continued)

*Primary Examiner* — Ghodrat Jamshidi
(74) *Attorney, Agent, or Firm* — Crawford Maunu PLLC

(57) ABSTRACT

Disclosed approaches for controlling debug access to an integrated circuit (IC) device include receiving a debug packet by a debug interface circuit of the IC device. The debug interface circuit authenticates the debug packet in response to the debug packet having a command code that specifies enable debug mode or a command code that specifies disable debug mode. In response to the debug packet passing authentication and the command code specifying enable, the debug interface circuit enables debug mode of the IC device. In response to the debug packet passing authentication and the command code specifying disable, the debug interface circuit disables the debug mode of the IC device. In response to the debug packet failing authentication, the debug interface circuit rejects the debug packet.

20 Claims, 4 Drawing Sheets

(56) References Cited

U.S. PATENT DOCUMENTS

| | | | | |
|---|---|---|---|---|
| 2010/0162049 A1* | 6/2010 | Stall | ............... | G06F 11/3624 |
| | | | | 714/38.14 |
| 2011/0307871 A1* | 12/2011 | Branda | ............... | G06F 11/3644 |
| | | | | 717/129 |
| 2014/0201354 A1* | 7/2014 | Matthews | ............... | H04L 47/32 |
| | | | | 709/224 |
| 2014/0344960 A1* | 11/2014 | Adams | ............... | G06F 21/57 |
| | | | | 726/34 |
| 2015/0106792 A1* | 4/2015 | Traylor | ............... | G06F 11/302 |
| | | | | 717/128 |
| 2019/0347401 A1* | 11/2019 | Chen | ............... | H04L 9/0869 |
| 2020/0293659 A1* | 9/2020 | Yamada | ............... | G06F 21/64 |
| 2020/0334045 A1* | 10/2020 | Chaiken | ............... | G06F 21/575 |
| 2021/0124711 A1* | 4/2021 | Ansari | ............... | G06F 11/0736 |
| 2021/0165861 A1* | 6/2021 | Halim | ............... | G06F 9/44594 |

OTHER PUBLICATIONS

Xilinx, Inc., Zynq UltraScale+ MPSoC, Software Developer Guide, User Guilde, UG 1137, pp. 1-620, San Jose, CA USA.

\* cited by examiner

SYSTEM-ON-CHIP HAVING SECURE DEBUG MODE

TECHNICAL FIELD

The disclosure generally relates to a system-on-chip having a secure debug mode.

BACKGROUND

After configuring a system-on-chip (SoC) with application program code and/or configuration data for programmable logic, the debug mode of some SoCs is sometimes disabled by executing code on the SoC processor to configure a debug control register with data that disables a Joint Test Access Group (JTAG) interface. Disabling the JTAG interface for debugging protects the SoC against unauthorized JTAG access. To enable debug mode, program code can be executed on the SoC processor to reconfigure the debug control register to allow input of JTAG commands.

The Xilinx Virtual Cable (XVC) product functions like a JTAG cable and can provide access to the JTAG interface for debugging an SoC without using a physical cable. XVC supports debugging an SoC over internal networks or the over the Internet and operates according to the transmission control protocol/Internet protocol (TCP/IP).

Though network access to a JTAG interface can be convenient, device security may be compromised. Physical access to the SoC can be limited in order to protect against some device intrusions. To support debugging an SoC design while protecting against unauthorized access, debugging can be limited to on-site activities. Alternatively, the SoC could be removed from the site and shipped for analysis to another secure site, such as an SoC vendor's facility. However, limiting physical access to an SoC for debugging negates some of the benefits of products such as XVC.

SUMMARY

A disclosed method for controlling debug access to an integrated circuit (IC) device includes receiving a debug packet by a debug interface circuit of the IC device. The debug interface circuit authenticates the debug packet in response to the debug packet having a command code that specifies enable debug mode or a command code that specifies disable debug mode. In response to the debug packet passing authentication and the command code specifying enable, the debug interface circuit enables debug mode of the IC device. In response to the debug packet passing authentication and the command code specifying disable, the debug interface circuit disables the debug mode of the IC device. In response to the debug packet failing authentication, the debug interface circuit rejects the debug packet.

A disclosed system includes an integrated circuit (IC) device, a network interface circuit disposed on the IC device, and a debug interface circuit disposed on the IC device and coupled to the network interface circuit. The debug interface circuit is configured to receive a debug packet, and authenticate the debug packet in response to the debug packet having a command code that specifies enable debug mode or a command code that specifies disable debug mode. The debug interface circuit is configured to enable a debug mode of the IC device in response to the debug packet passing authentication, and the command code specifying enable. The debug interface circuit is configured to disable the debug mode of the IC device in response to the debug packet passing authentication, and the command code specifying disable. The debug interface circuit is configured to reject the debug packet in response to the debug packet failing authentication.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which.

DETAILED DESCRIPTION

Figure 1:
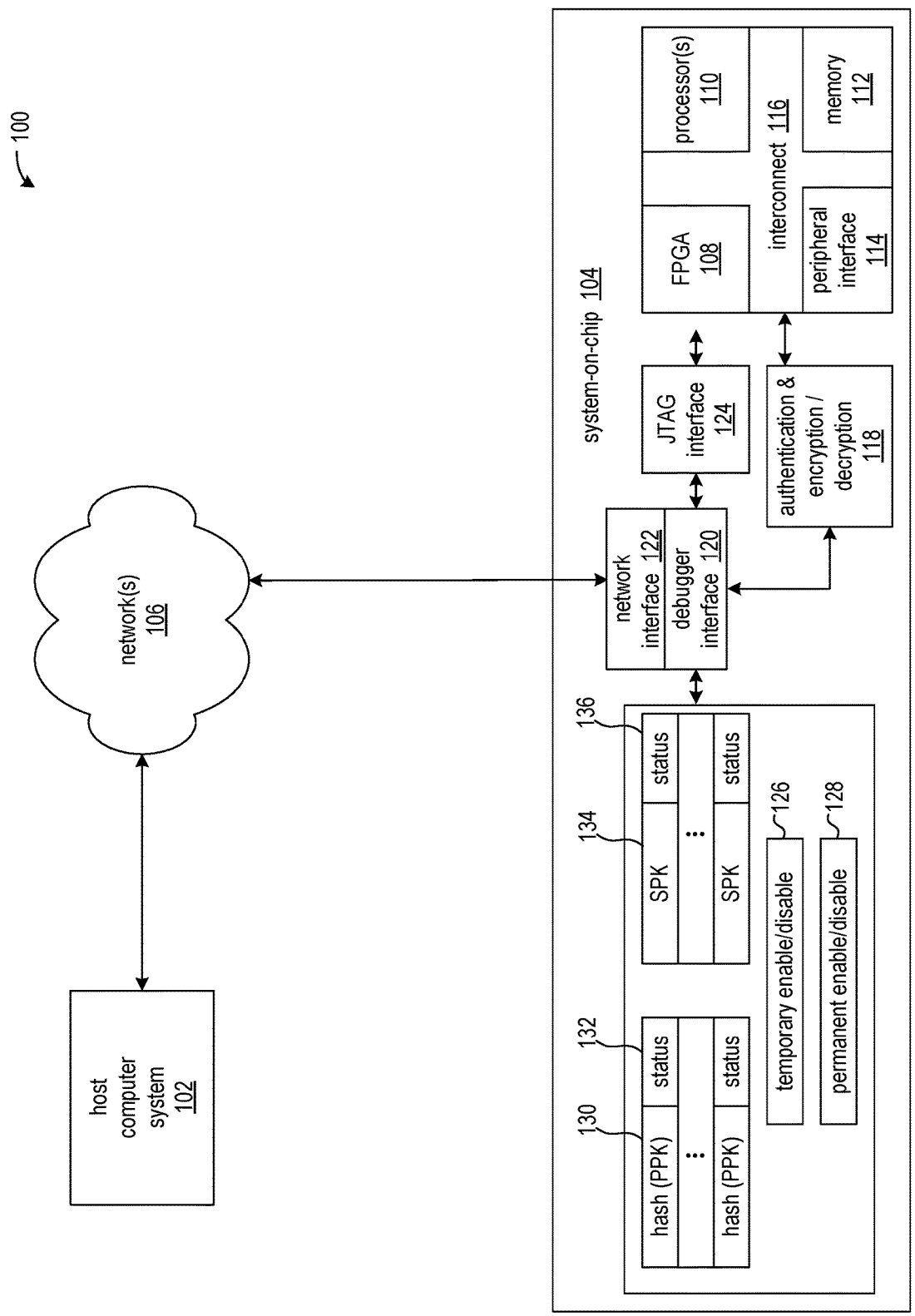
FIG. 1 shows a system that supports secured, remote debugging of an SoC.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches provide methods and systems that support remote debugging of an SoC while protecting the SoC against unauthorized access while in a debug mode. Security is provided for enabling debugging from a remote host. Security logic on the SoC authenticates debug packet for enabling and disabling debug mode of the SoC. The authenticated debug packet can be prepared by the remote host and transmitted to the SoC. The authenticated debug packet functions as a key to unlock the JTAG interface for input of debug commands, or to lock the JTAG interface to prevent unauthorized debugging. The methods and systems have a debug interface circuit disposed on an integrated circuit (IC) chip or package (also referred to herein as an "IC device"), such as an SoC. The debug interface circuit provides an interface between an off-device controller and a test access interface of the device, such as a JTAG interface.

Some SoCs, can default to a debug-disabled mode after booting. Before debugging can commence, debug mode of the SoC must be enabled. In response to receiving a debug packet that directs the debug interface circuit to enable debug mode, the debug interface circuit authenticates the debug packet. If the debug packet passes authentication, the debug interface circuit enables debug mode of the SoC. If the debug packet fails authentication, the debug interface circuit rejects the debug packet and leaves the SoC in the current debug mode. Once debug mode is enabled, the debug interface circuit can follow a similar procedure to securely disable debug mode of the SoC.

FIG. 1 shows a system 100 that supports secured, remote debugging of an SoC. A host computer system 102 is communicatively coupled to the SoC 104 via one or more networks 106. The host computer system can execute software that enables debugging of the SoC. For example, the Vivado Design Suite from XILINX, Inc., supports for programming and debugging of SoCs and can be coupled to the SoC via a local area network or a combination of networks such as the Internet.

SoCs can include a variety of subsystems, and the exemplary SoC is shown as having field programmable gate array (FPGA) circuitry 108, one or more microprocessors 110, random access memory 112, and peripheral interface circuitry 114, all of which can be communicatively coupled by interconnect circuitry 116. The interconnect circuitry can be a network-on-chip (NoC), for example.

As used herein, "SoC" will be used to refer to systems implemented on a single semiconductor die as well as systems implemented on multiple dice and interconnected by a semiconductor interposer(s). Multi-die systems are sometimes referred to as systems-in-package, or "SiPs." The SoC can include a microprocessor, programmable logic circuitry, or hardwired circuitry for performing authentication, encryption, and decryption functions. Block 118 represents the circuitry that provides the encryption and decryption functions.

The debugger interface 120, which is alternatively referred to herein as the "debug interface circuit," provides secure access to the SoC for debugging from a remote source, such as host 102 executing debugging software. The debugger interface 120 can be coupled to the network(s) 106 via a standard network interface 122. The debugger interface can be implemented on a microprocessor, programmable logic circuitry, or hardwired circuitry of the SoC.

In order to enable remote debugging, the debugger interface authenticates a remote request to enable debug mode of the SoC. Similarly, the debugger interface authenticates a remote request to disable debug mode of the SoC. Once debug mode of the SoC is enabled, the debugger interface can provide debug packets received from the host 102 to a test interface, such as the JTAG interface 124.

The JTAG interface provides access to a test access port, which is coupled to access storage circuits of the FPGA, processor(s), memory, peripheral interfaces, and interconnect.

The debug interface circuit receives debug packets from the network(s) 106. If debug mode of the SoC is currently enabled, the debugger interface circuit can pass an input debug packet to the JTAG interface. A debug packet can have a function/command code that specifies either debug-enable or debug-disable. In response to the debug packet having a function/command code that specifies debug-enable or debug-disable, the debug interface circuit authenticates debug packet. In response to the debug packet passing authentication, the debug interface circuit enables ("debug-enabled mode") or disables ("debug-disabled mode") debug mode of the SoC, depending on the code in the debug packet. In response to the debug packet failing authentication, the debug interface circuit can reject the debug packet. Rejecting the packet can include disregarding the packet without issuing a response or generating a response to the issuer.

The debug mode of the SoC can be either temporarily or permanently enabled or disabled. The debug mode of the SoC can be temporarily enabled or disabled by the debugger interface circuit in response to a command code in an authenticated debug packet. A non-volatile and reprogrammable bi-stable circuit, which is shown as block 126, can be used to indicate whether the debug mode is enabled or disabled.

The debug mode of the SoC can be permanently enabled or disabled. Multiple non-volatile bi-stable circuits, such as eFuses, which are shown as block 128, can be used to indicate whether debug mode is permanently enabled or disabled.

Authentication of a debug packet can include use of public-private key pairs. A debug packet can include a primary public key (PPK), which is the public key of a public-private key pair. Authentication can include the debug interface circuit determining whether or not the PPK in the debug packet matches a PPK stored in the SoC. The SoC has non-volatile storage 130 for multiple PPKs. The representations may be the binary format of the values of the actual PPKs or may be binary formats of hash values of the PPKs. The hash function can be based on a secure hash algorithm (SHA), for example.

The PPK in a debug packet can also be used in authentication of the debug packet through a signature of the packet. The debug interface circuit can determine a signature from data of the debug packet using the PPK from the debug packet, and then determine whether or not the computed signature matches the signature included in the debug packet. If the computed signature and the packet signature do not match, the debug interface circuit can signal failure of authentication and reject the packet as described above. If the computed signature and the packet signature match, the debug interface circuit can signal that the packet passed authentication and enable or disable debug mode of the SoC.

The disclosed approaches support revoking a PPK. A PPK can be revoked after having been used for a certain period of time or for a certain number of enable/disable cycles. The revoked/unrevoked status of a PPK can be indicated by the state of one or more bi-stable circuits 132 associated with the stored PPK.

If the PPK in a debug packet matches one of the PPKs stored in the SoC, the debug interface circuit can check whether the PPK is revoked or unrevoked before authenticating a debug packet using the signature in the packet. If the PPK is in a revoked state, the debug packet can be rejected as described above. If the PPK is in an unrevoked state, the debug circuit can continue with authentication, and eventually enable/disable debug mode as described above.

Authentication of a debug packet can additionally use a secondary public key (SPK). The SoC has non-volatile storage 130 for multiple SPKs, which can be stored in bi-stable circuits 134 and respectively associated with the PPKs 130. A debug packet can include an SPK, and in order for the packet to be authenticated, the packet SPK must match an SPK that is stored in the SoC and associated with a matching PPK stored in the SoC. If the SPK in the debug packet does not match the SPK stored in the SoC, the debug interface circuit can reject the packet as described above. Otherwise, the debug mode of the SoC can be enabled or disabled according to the debug packet.

The disclosed approaches support revoking an SPK. An SPK can be revoked after having been used for a certain period of time or for a certain number of enable/disable cycles. The revoked/unrevoked status of an SPK can be indicated by the state of one or more bi-stable circuits 136 associated with the stored SPK. If the SPK in a debug packet matches the SPK stored in the SoC and associated with the matching PPK, the debug interface circuit can check whether the SPK is revoked or unrevoked. If the SPK is in a revoked state, the debug packet can be rejected as described above. If the SPK is in an unrevoked state, the debug circuit can enable or disable debug mode as described above.

Figure 2:
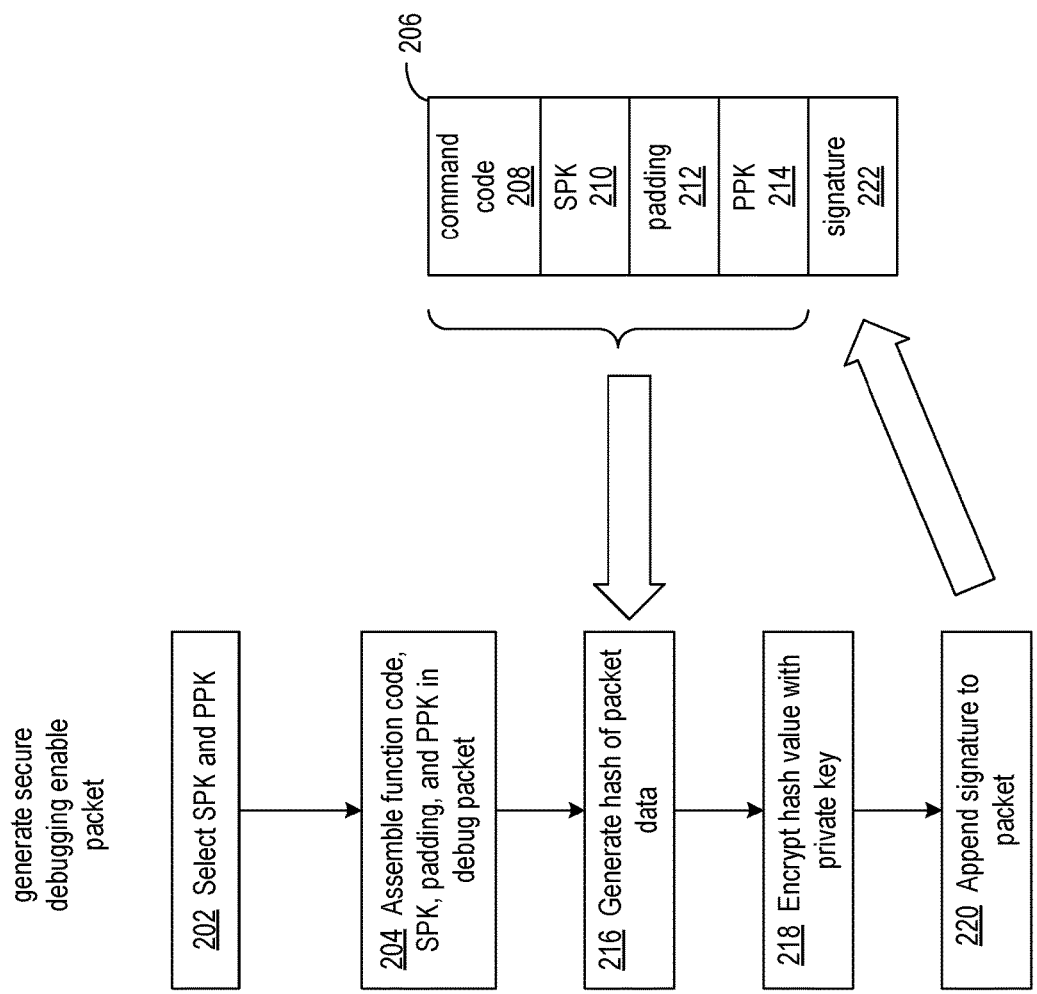
FIG. 2 shows an exemplary process of generating a debug packet

FIG. 2 shows an exemplary process of generating a debug packet 206. The process can be performed by a host computer executing debugger software. At block 202, the host computer selects the SPK and PPK to use in the debug packet.

At block 204, the host computer assembles the packet information into a debug packet in memory of the host computer. The packet information can include a command code 208, the SPK 210, padding 212, and the PPK 214. The command code can specify whether debug mode of the SoC is to be enabled or disabled. Multiple command codes can be specified in a debug packet. The padding can be data that is used in generating a signature for the debug packet.

At block 216, the host applies a hash function to the debug packet data, including the command code, SPK, padding, and PPK. The resulting hash value is then encrypted at block 218 using the private key associated with the PPK of the public-private key pair. The result is appended at block 220 as the signature 222 of the debug packet 206.

Figure 3:
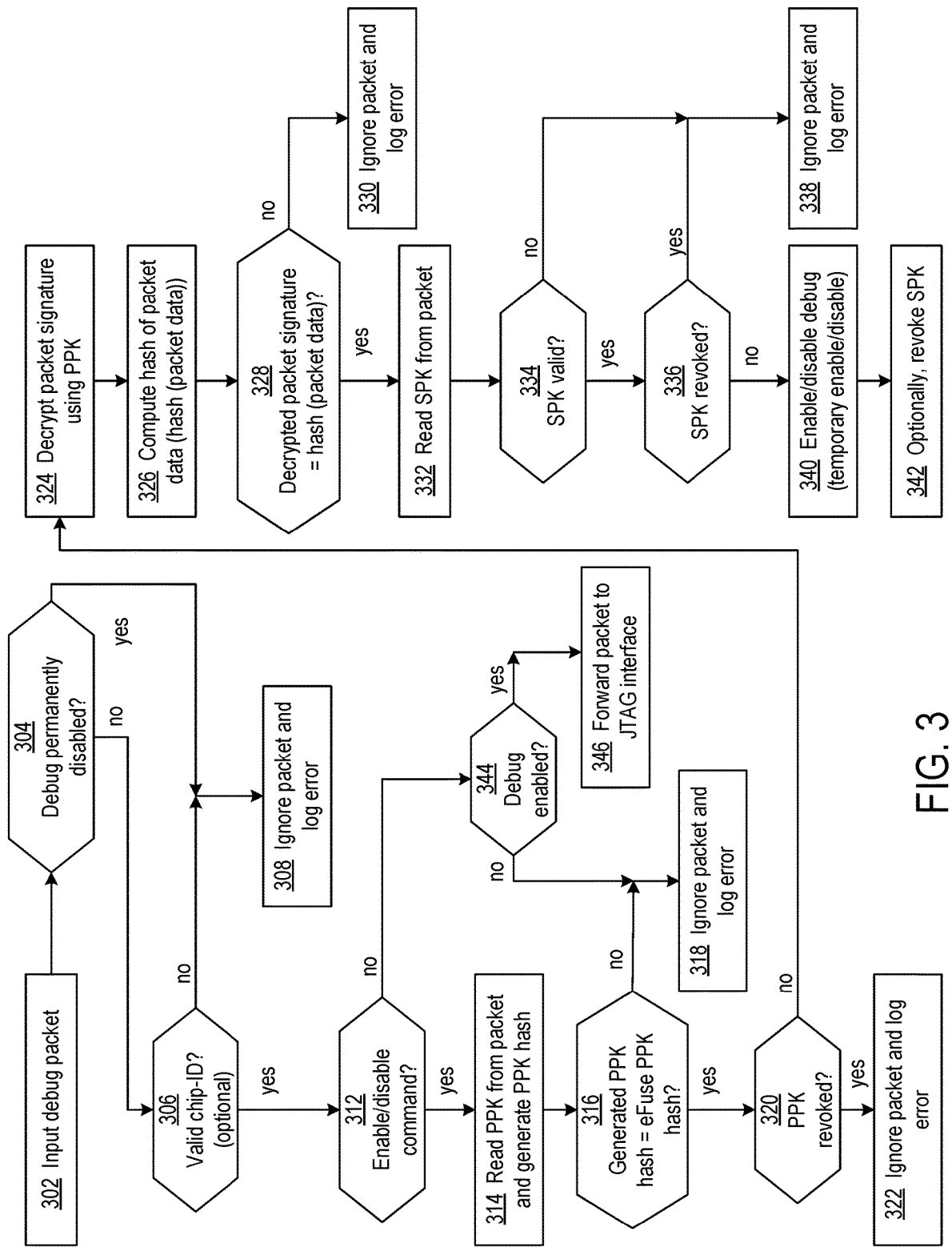
FIG. 3 shows a flowchart of an exemplary process of securely enabling and disabling debug mode of an SoC.

FIG. 3 shows a flowchart of an exemplary process of securely enabling and disabling debug mode of an SoC. At block 302, a debug interface circuit on the SoC inputs a debug packet received over a network. The debug circuit at block 304 checks whether or not debug mode of the SoC has been permanently disabled. Debug mode can be permanently disabled by blowing an eFuse whose purpose is to permanently disable remote debugging of the SoC. The debug interface circuit inputs the signal from the eFuse, and in response to the state of the eFuse indicating that debug mode is permanently disabled, the debug interface circuit proceeds to block 308 to reject the debug packet. The debug interface circuit can reject the debug packet by disregarding any commands in the packet, optionally issuing a response, and optionally logging error data in memory of the SoC. As an optional feature, a debug packet can be sent to permanently enable SoC debug mode, which blows an eFuse and causes the debug interface circuit to forward debug packets to the JTAG interface at block 346 without performing authentication.

If the debug mode has not been permanently disabled, the debug interface circuit at decision block 306 optionally checks whether or not a chip identifier in the debug packet matches the chip identifier stored on the SoC. The chip identifier in the debug packets can be used to restrict debug commands to an individual SoC or a group of similar SoCs. If the chip identifier in the packet is not valid, the packet can be ignored at block 308. Otherwise, the debug interface circuit continues at decision block 312.

At decision block 312, the debug interface circuit determines whether or not a command code in the debug packet specifies either to enable or to disable the debug mode. A debug packet can include a single or multiple debug commands. A debug packet can also specify control information such as specifying those commands that are permitted and/or those commands that are not permitted until the next power-on/reset of the SoC. In response to a debug command that had previously been disabled, the debug interface circuit ignores the packet at block 318.

In response to the debug packet having a command that specifies enabling or disabling debug mode, at decision block 314 the debug interface circuit reads the PPK from the packet and generates a hash value from that PPK. At decision block 316, the debug interface circuit determines whether or not the generated PPK hash value is equal to any one of the PPK hash values 130 (FIG. 1) stored within the SoC.

In response to the generated PPK hash value being not equal to any of the stored PPK hash values, the debug interface circuit signals the failure to authenticate by proceeding to block 318 and rejecting the debug packet. In response to the generated PPK hash value being equal to one of the stored PPK hash values, the debug interface circuit signals partially passing authentication by proceeding to decision block 320.

At decision block 320, the debug interface circuit determines whether or not the matching PPK is in a revoked state or an unrevoked state based on the associated status register 132. In response to the status register indicating that the PPK is revoked, the debug packet is rejected at block 322. Otherwise, the debug interface circuit proceeds to block 324.

At block 324, the debug interface circuit decrypts the signature 222 (FIG. 2) from the debug packet using the PPK 214 (FIG. 2) from the debug packet. At block 326, a packet hash value is computed based on the packet data by the debug interface circuit. The packet hash value is the computed signature of the debug packet. The decrypted packet signature is compared to the package hash value at decision block 328. In response to the decrypted packet signature not matching the packet hash value, the debug interface circuit signals failure of authentication by rejecting the packet at block 330. In response to the decrypted packet signature matching the packet hash value, the debug interface circuit signals successful authentication by proceeding to decision block 332.

At block 332, the debug interface circuit reads the SPK from the debug packet. The validity of the SPK is determined by the debug interface circuit at decision block 334 based on whether or not the packet SPK matches the SPK that is associated with the matching PPK and stored within the SoC. In response to the packet SPK not matching the SPK that is associated with the matching PPK, the debug interface circuit rejects the packet at block 338. Otherwise, at decision block 336, the debug interface circuit determines whether or not the SPK is in a revoked state or an unrevoked state based on the state of the storage circuit 136 (FIG. 1) associated with the SPK. In response to the SPK being in a revoked state, the debug interface circuit rejects the debug packet at block 338.

In response to the SPK being valid and in an unrevoked state, at block 340 the debug circuit enables or disables the SoC debug mode according to the command code in the debug packet. The status of the debug mode (enabled or disabled) can be indicated by storing the appropriate value in the temporary enable/disable register 126 (FIG. 1). The debug interface can optionally revoke the SPK at block 342 as an added measure of security.

At decision block 344, in response to the debug packet not having an enable/disable command code and debug mode being enabled, the debug interface circuit at block 346 forwards the debug packet to a test access port of the SoC.

Figure 4:
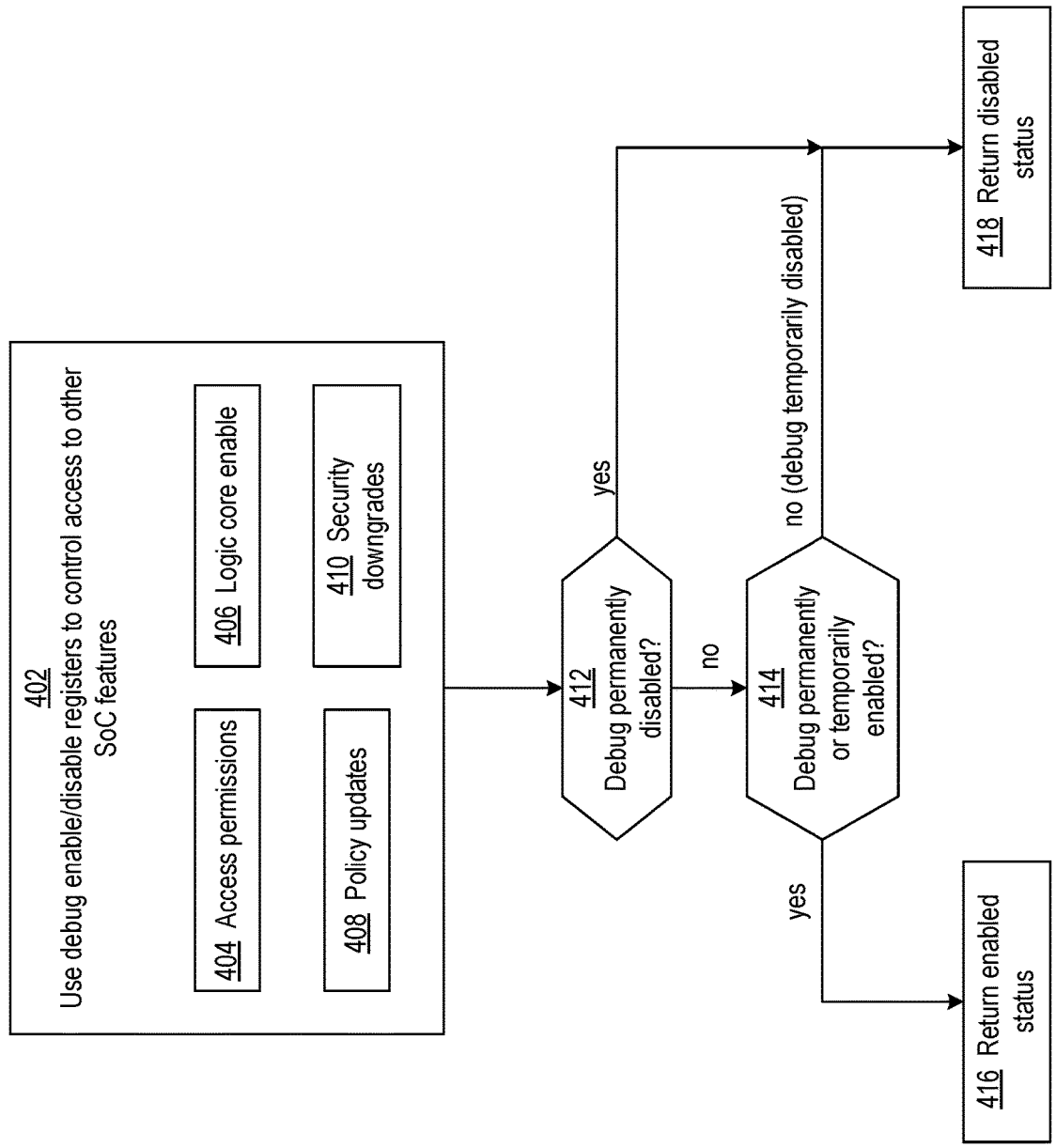
FIG. 4 shows a flowchart of an exemplary process in which the temporary enable/disable register can be used to control features other than input of debug commands.

FIG. 4 shows a flowchart of an exemplary process in which the temporary enable/disable register can be used to control features other than input of debug commands. At block 402, functions such as access permissions, 404, logic core enables 406, security downgrades 410, and policy updates 408 can initiate checking the debug status. In response to the debug mode being permanently disabled, decision block 412 directs the process to block 418 where a status code that indicates the feature is disabled can be returned.

If debug mode is not permanently disabled, decision block 414 determines whether or not debug mode is temporarily disabled. If debug mode is temporarily disabled, the process is directed to block 418 to return a disabled status code. Otherwise, at block 416 status code that indicates the feature is enabled is returned.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for providing secure access to debugging an SoC. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising:
   receiving a debug packet by a debug interface circuit of an integrated circuit (IC);
   authenticating the debug packet in response to the debug packet having a command code that specifies enable debug mode or a command code that specifies disable debug mode;
   enabling a debug mode of the integrated circuit in response to the debug packet passing authentication, and the command code specifying enable;
   disabling the debug mode of the integrated circuit in response to the debug packet passing authentication, and the command code specifying disable; and
   rejecting the debug packet in response to the debug packet failing authentication.

2. The method of claim 1, further comprising:
   rejecting the debug packet in response to the debug mode being disabled and the command code not specifying enable debug mode; and
   forwarding the debug packet to a test access port of the IC in response to the debug mode being enabled and the command code not specifying disable debug mode.

3. The method of claim 1, wherein the authenticating includes determining whether or not a primary public key (PPK) in the debug packet matches a PPK stored within the integrated circuit.

4. The method of claim 3, wherein the authenticating includes:
   determining a first signature from data of the debug packet using the PPK from the debug packet;
   determining whether or not a second signature from the debug packet matches the first signature;
   signaling failure of authentication in response to the second signature not matching the first signature; and
   signaling passing of authentication in response to the second signature matching the first signature.

5. The method of claim 4, further comprising:
   decrypting the second signature from the debug packet into a decrypted signature using the PPK from the debug packet
   wherein the determining the first signature includes computing a hash value from the data of the debug packet; and
   wherein the determining whether or not the second signature from the debug packet matches the first signature includes comparing the hash value to the decrypted signature.

6. The method of claim 3, further comprising:
   determining whether or not the PPK in the debug packet matches one PPK of a plurality of PPKs stored within the IC;
   determining whether or not the one PPK is in a revoked state or an unrevoked state based on a state of a storage circuit associated with the one PPK, in response to determining that the PPK in the debug packet matches one of the plurality of PPKs stored within the IC;
   rejecting the debug packet in response to the one PPK being in the revoked state;
   enabling the debug mode in response to the one PPK being in the unrevoked state and the command code specifying enable; and
   disabling the debug mode in response to the one PPK being in the unrevoked state and the command code specifying disable.

7. The method of claim 6, further comprising:
   determining whether or not a first secondary public key (SPK) in the debug packet matches a second SPK stored within the IC and associated with the one PPK;
   rejecting the debug packet in response to the first SPK not matching the second SPK;
   enabling the debug mode in response to the first SPK matching the second SPK and the command code specifying enable; and
   disabling the debug mode in response to the first SPK matching the second SPK and the command code specifying disable.

8. The method of claim 7, further comprising:
   determining whether or not the second SPK is in a revoked state or an unrevoked state based on a state of a storage circuit associated with the second SPK, in response to determining that the first SPK matches the second SPK;
   rejecting the debug packet in response to the second SPK being in the revoked state;
   enabling the debug mode in response to the second SPK being in the unrevoked state and the command code specifying enable; and
   disabling the debug mode in response to the second SPK being in the unrevoked state and the command code specifying disable.

9. The method of claim 8, further comprising storing data in the storage circuit associated with the second SPK to indicate that the second SPK is in a revoked state in response to determining that the second SPK is in an unrevoked state and enabling the debug mode.

10. The method of claim 8, further comprising storing data in the storage circuit associated with the second SPK to indicate that the second SPK is in a revoked state in response to determining that the second SPK is in an unrevoked state and disabling the debug mode.

11. The method of claim 1, wherein the authenticating includes:
    generating a first hash value from a primary public key (PPK) in the debug packet;
    reading a second hash value stored within the IC, the second hash value representing a recognized PPK;
    signaling failure of authentication in response to the first hash value not equaling the second hash value; and
    signaling passing of authentication in response to the first hash value equaling the second hash value.

12. A system comprising:
    an integrated circuit (IC) device;
    a network interface circuit disposed on the IC device;

a debug interface circuit disposed on the IC device and coupled to the network interface circuit and configured to:
  receive a debug packet;
  authenticate the debug packet in response to the debug packet having a command code that specifies enable debug mode or a command code that specifies disable debug mode;
  enable a debug mode of the IC device in response to the debug packet passing authentication, and the command code specifying enable;
  disable the debug mode of the IC device in response to the debug packet passing authentication, and the command code specifying disable; and
  reject the debug packet in response to the debug packet failing authentication.

13. The system of claim 12, further comprising a test access circuit disposed on the IC device and coupled to the debug interface circuit, wherein the debug interface circuit is configured to:
  reject the debug packet in response to the debug mode being disabled and the command code not specifying enable debug mode; and
  forward the debug packet to the test access circuit in response to the debug mode being enabled and the command code not specifying disable debug mode.

14. The system of claim 12, wherein the debug interface circuit is configured to determine whether or not a primary public key (PPK) in the debug packet matches a PPK stored within the IC device.

15. The system of claim 14, wherein the debug interface circuit is configured to:
  determine a first signature from data of the debug packet using the PPK from the debug packet;
  determine whether or not a second signature from the debug packet matches the first signature;
  signal failure of authentication in response to the second signature not matching the first signature; and
  signal passing of authentication in response to the second signature matching the first signature.

16. The system of claim 15, wherein the debug interface circuit is configured to:
  decrypt the second signature from the debug packet into a decrypted signature using the PPK from the debug packet
  compute a hash value from the data of the debug packet; and
  compare the hash value to the decrypted signature.

17. The system of claim 14, wherein the debug interface circuit is configured to:
  determine whether or not the PPK in the debug packet matches one PPK of a plurality of PPKs stored within the IC device;
  determine whether or not the one PPK is in a revoked state or an unrevoked state based on a state of a storage circuit associated with the one PPK, in response to determining that the PPK in the debug packet matches one of the plurality of PPKs stored within the IC device;
  reject the debug packet in response to the one PPK being in the revoked state;
  enable the debug mode in response to the one PPK being in the unrevoked state and the command code specifying enable; and
  disable the debug mode in response to the one PPK being in the unrevoked state and the command code specifying disable.

18. The system of claim 17, wherein the debug interface circuit is configured to:
  determine whether or not a first secondary public key (SPK) in the debug packet matches a second SPK stored within the IC and associated with the one PPK;
  reject the debug packet in response to the first SPK not matching the second SPK;
  enable the debug mode in response to the first SPK matching the second SPK and the command code specifying enable; and
  disable the debug mode in response to the first SPK matching the second SPK and the command code specifying disable.

19. The system of claim 18, wherein the debug interface circuit is configured to:
  determine whether or not the second SPK is in a revoked state or an unrevoked state based on a state of a storage circuit associated with the second SPK, in response to determining that the first SPK matches the second SPK;
  reject the debug packet in response to the second SPK being in the revoked state;
  enable the debug mode in response to the second SPK being in the unrevoked state and the command code specifying enable; and
  disable the debug mode in response to the second SPK being in the unrevoked state and the command code specifying disable.

20. The system of claim 19, wherein the debug interface circuit is configured to store data in the storage circuit associated with the second SPK to indicate that the second SPK is in a revoked state in response to determining that the second SPK is in an unrevoked state and enabling the debug mode.

* * * * *